C. HAYS.
Step-Ladders.
No. 5,451. Reissued June 17, 1873.
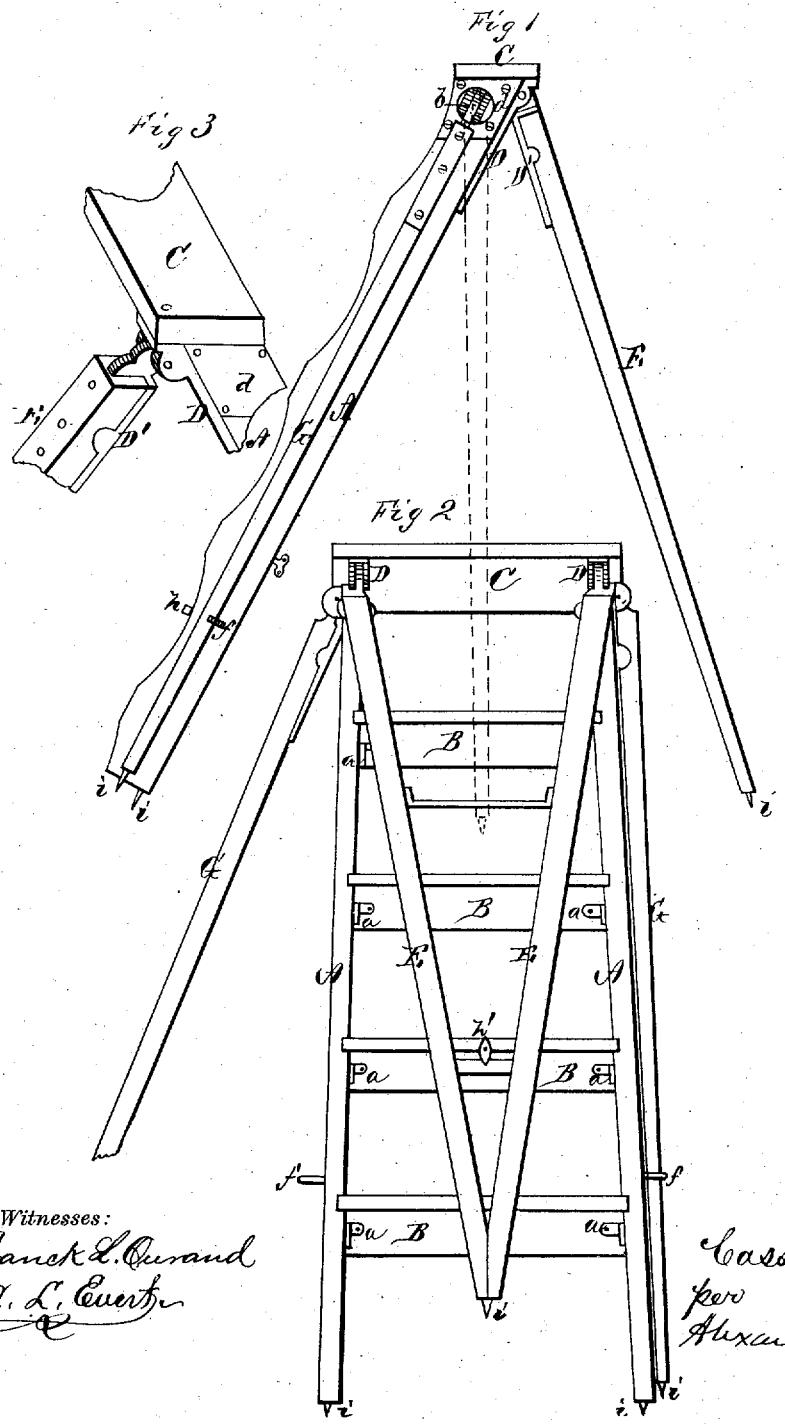
Witnesses:
Franck L. Durand
C. L. Ewert
Inventor.
Carson Hays.
per
Alexander Mason
Attorneys.

UNITED STATES PATENT OFFICE.

CASSON HAYS, OF WAUKESHA, WISCONSIN, ASSIGNOR TO THE KIP MANUFACTURING COMPANY.

IMPROVEMENT IN STEP-LADDERS.

Specification forming part of Letters Patent No. 46,105, dated January 31, 1865; reissue No. 5,451, dated June 17, 1873; application filed May 21, 1873.

*To all whom it may concern:*

Be it known that I, CASSON HAYS, of the town of Waukesha, in the county of Waukesha and State of Wisconsin, have invented certain new and useful Improvements in Step-Ladders; and I do hereby declare that the following is a full, clear, and exact description thereof that will enable others skilled in the art to which it appertains to make and use the same, reference being had to the accompanying drawings and to the letters of reference marked thereon, which form a part of this specification.

The nature of my invention consists in the construction and arrangement of a step-ladder, as will be hereinafter more fully set forth.

In the accompanying drawing Figure 1 is a side elevation, and Fig. 2 is a rear view of my step-ladder. Fig. 3 is a perspective view of one end of the top platform, showing the mode of connecting the side-piece and brace to the same.

Like letters of reference in the several figures indicate corresponding parts.

A A represent the side pieces or stiles of my step-ladder, which may be constructed in any ordinary or suitable manner. B B represent the steps, which are let into the side-pieces A A, or otherwise secured to the same in any suitable manner, and, in addition to such fastening, I use angle-irons *a a* inserted under the steps in the angles between the steps and the side pieces, which will prevent the joints from becoming strained when the ladder is placed on uneven ground, and a weight is put on the ladder. C represents the top platform, which is secured on top of the side pieces A A, so that the front edge of the platform will be flush with the front edges of the side pieces, as shown in Fig. 1. The side-pieces and platform are further connected by means of brackets D D, one of which is attached to the back edge of each side piece A, and also to the bottom of the platform C, extending flush with the rear edge of the same. The platform C is thus at or near each end provided with a support which extends the entire width of the platform, making the same perfectly firm and not liable to split or be broken. Each of the brackets D has two ears formed on the rear side, as shown, between which the end of another bracket, D′, is pivoted, said bracket D′ being attached to the back-brace E, thus forming a hinge to connect the back-braces with the side pieces and top platform.

When, as is very frequently the case, the step-ladder is intended for use out of doors, it is often found necessary to place it upon ground that is sloping; and for such uses it is better to have but a single foot to support the ladder in rear. For this purpose I join the two braces E E at their lower ends, as shown in Fig. 2. G G represent side-braces attached to the upper ends of the side pieces A A by swivel-joints *b b*, so that they may move in all directions for the purpose of supporting the top of the ladder when standing upon inclined ground. The swivel-joint *b* is constructed by protruding a round pin having a flanged head through a corresponding hole in a suitable plate, *d*, by means of which the whole is attached to the side piece as shown. Upon the outer end of the pin is a suitable joint attaching it to the upper end of the side brace G.

It will be readily seen that while the joint allows free motion of the braces in a lateral direction, the swivel allows it to move with equal freedom in a direction at right angles to the movement of the joint, and the result of these two motions is to produce a universal joint.

*i i* are metal points set in the ends of the side pieces A A and the braces E and G in order to prevent any possibility of said parts slipping.

When the braces are not in use, or for transportation, the side braces G G are secured in hooks *f f* on the side pieces A A by buttons *h h*, and the back-braces E secured by a button, *h′*, as shown.

Having thus fully described my invention, what I claim as new, and desire to secure by Letters Patent, is—

1. The combination in a step-ladder of a stile, A, or its equivalent, a platform or top step, and a bracket, when said bracket connects the stile to the platform as herein set forth.

2. In combination with a stile, or its equivalent, a platform and a back-brace of a step-ladder, a bracket, when said bracket connects said parts together for the purpose specified.

3. The combination in a step-ladder of the braces E E, hinged to the platform C, inclined inward and connected together at their lower ends, forming a single bearing-point, substantially as herein set forth.

4. The adjustable side-braces G G and swivel-joints *b b*, in combination with the back-brace E, as and for the purposes herein set forth.

5. The angle-irons *a a*, connecting the steps and side pieces of a step-ladder, substantially as and for the purposes herein set forth.

6. In combination with the side-braces G G the hooks *f* and buttons *h*, for the purposes herein set forth.

In testimony that I claim the foregoing I have hereunto set my hand this 2d day of April, 1873.

Witnesses: CASSON HAYS.

VERNON TICHENOR,

FRANK MCBEATH.